(12) United States Patent
Karpenman

(10) Patent No.: US 10,196,060 B2
(45) Date of Patent: Feb. 5, 2019

(54) METHOD FOR PRESELECTING A GEAR IN A MULTI-CLUTCH TRANSMISSION OF A VEHICLE UPON EXITING FREE-WHEELING STATE

(71) Applicant: VOLVO TRUCK CORPORATION, Göteborg (SE)

(72) Inventor: Fredrik Karpenman, Västra Frölunda (SE)

(73) Assignee: Volvo Truck Corporation, Göteborg (SE)

( * ) Notice: Subject to any disclaimer, the term of this patent is extended or adjusted under 35 U.S.C. 154(b) by 352 days.

(21) Appl. No.: 15/023,237

(22) PCT Filed: Oct. 11, 2013

(86) PCT No.: PCT/EP2013/003057
§ 371 (c)(1),
(2) Date: Mar. 18, 2016

(87) PCT Pub. No.: WO2015/051812
PCT Pub. Date: Apr. 16, 2015

(65) Prior Publication Data
US 2016/0229407 A1    Aug. 11, 2016

(51) Int. Cl.
*B60W 30/18*    (2012.01)
*B60W 10/113*    (2012.01)
(Continued)

(52) U.S. Cl.
CPC ...... *B60W 30/18072* (2013.01); *B60W 10/02* (2013.01); *B60W 10/06* (2013.01);
(Continued)

(58) Field of Classification Search
CPC .... B60W 10/02; B60W 10/113; B60W 10/06; B60W 30/18072; B60W 2030/1809; F16H 61/688; F16H 61/0403
See application file for complete search history.

(56) References Cited

U.S. PATENT DOCUMENTS 9,464,715 B2 *  10/2016  Kawamoto ..... B60W 30/18027
2002/0088290 A1 *  7/2002  Bowen ............... F16H 3/006
74/335

(Continued)

FOREIGN PATENT DOCUMENTS

| CN | 101956791 A | 1/2011 |
|---|---|---|
| CN | 102052455 A | 5/2011 |

(Continued)

OTHER PUBLICATIONS

International Search Report (dated Dec. 6, 2014) for corresponding International App. PCT/EP2013/003057.
(Continued)

*Primary Examiner* — Stacey A Fluhart
(74) *Attorney, Agent, or Firm* — WRB-IP LLP

(57) ABSTRACT

A method is provided for preselecting a gear in a multi-clutch transmission of a vehicle upon exiting free-wheeling state, wherein the multi-clutch transmission being operated in a free-wheeling state having a gear of a first set of gears preselected and a first friction clutch being disengaged; the method including the steps of: A) upon determining that at least one predetermined condition for exiting free-wheeling state is met; increasing the rotational speed of the prime mover towards a rotational synchronization speed of the preselected gear; the second friction clutch being in a closed state such that the rotational speed of the input shaft of the second friction clutch increases with the increasing rotational speed of the prime mover; B) disengaging the second friction clutch; C) engaging, at a suitable time point, at least (Continued)

one tooth clutch of the second subset of the tooth clutches corresponding to a gear of the second set of gears such that the gear of the second set of gears becomes preselected.

20 Claims, 4 Drawing Sheets

(51) Int. Cl.
  *F16H 61/04* (2006.01)
  *F16H 61/688* (2006.01)
  *B60W 10/02* (2006.01)
  *B60W 10/06* (2006.01)

(52) U.S. Cl.
  CPC ....... *B60W 10/113* (2013.01); *F16H 61/0403* (2013.01); *F16H 61/688* (2013.01); *B60W 2030/1809* (2013.01); *B60W 2510/1015* (2013.01); *B60Y 2300/18083* (2013.01); *F16H 2061/0496* (2013.01)

(56) References Cited

U.S. PATENT DOCUMENTS

2002/0183162 A1* 12/2002 Ogawa .................. B60W 10/02
                                                                    477/70
2007/0265137 A1* 11/2007 Jiang ..................... B60W 10/02
                                                                    477/176
2011/0313631 A1   12/2011 Roth
2012/0196722 A1*  8/2012 Preisner ............... B60W 10/02
                                                                    477/166

FOREIGN PATENT DOCUMENTS

| | | |
|---|---|---|
| CN | 102080722 A | 6/2011 |
| CN | 102557241 A | 9/2012 |
| CN | 102918300 A | 2/2013 |
| CN | 103210230 A | 7/2013 |
| DE | 199 39 819 C1 | 11/2000 |
| DE | 102006010934 A1 | 9/2006 |
| DE | 102010024045 A1 | 12/2011 |
| EP | 2 327 901 A1 | 6/2011 |
| GB | 249066 A | 12/2012 |
| WO | WO-0166971 A1 * 9/2001 ............... B60K 6/48 |
| WO | 2012019586 A1 | 2/2012 |

OTHER PUBLICATIONS

Chinese Official Action (dated Mar. 17, 2017) for corresponding Chinese App. 201380080178.5.

* cited by examiner

METHOD FOR PRESELECTING A GEAR IN A MULTI-CLUTCH TRANSMISSION OF A VEHICLE UPON EXITING FREE-WHEELING STATE

BACKGROUND AND SUMMARY

This disclosure relates to a method for preselecting a gear in a multi-clutch transmission of a vehicle upon exiting free-wheeling state; the multi-clutch transmission comprising friction clutches drivingly connected to a prime mover, an transmission output shaft and a main transmission that comprises input shafts connected to said friction clutches, a countershaft (parallel to at least one of said input shafts, gearwheels and tooth clutches; wherein the multi-clutch transmission being operated in a free-wheeling state having a gear of said first set of gears preselected; the first friction clutch being disengaged. The method according to the disclosure may be applied to all multi-clutch transmissions, and is consider particularly suitably for use in heavy vehicles such as trucks, buses, construction vehicles and the like.

In principle, a dual clutch transmission has two input shafts, each connectable to a friction clutch and to the output of the engine. Functionally, this is equivalent to having two conventional transmissions in parallel, i.e., two parallel sub-transmissions, and using one at a time for power transfer.

The sub-transmission that is not used, idling, for the time being can have a gear engaged and prepared, i.e. preselected, for a subsequent gear shift. The subsequent gear shift is carried out by simultaneously disengaging the friction clutch of the previously used sub-transmission and engaging the friction clutch of the previously idling sub-transmission.

Normally, in a dual clutch transmission, gears are preselected in the presently idling sub-transmission by engaging and disengaging tooth clutches. For a smooth and durable operation, this requires that the parts to be engaged by a tooth clutch are synchronized, i.e., that they have fairly equal rotational speed. If not, the clutch teeth would clash, resulting in worn or broken teeth and noise. A mismatch in rotational speed will also result in torque disturbance felt by the driver. So, different kinds of devices and arrangements are used for synchronizing the parts to be engaged. A straightforward solution is to have every tooth clutch in the transmission designed as synchronizers, i.e., be equipped with synchronizing clutch elements, e.g. as in US2008/0188342A1. However this solution has the disadvantage of relatively high manufacturing costs.

An alternative solution for synchronising of the transmission is use of a central synchronizing unit. Basically, only two synchronizing devices are required one that can make the speed of the first sub-transmission larger than that of the second sub-transmission, and one that can make the speed of the first sub-transmission less than that of the second. That will work when the first sub-transmission is idling and the second is active, as well as when the first sub-transmission is active and the second is idling. Such a device is referred to as a central synchronizing unit. The central synchronizing unit eliminates the need for providing each individual tooth clutch with a separate synchronisation surface and may consequently result in reduced overall manufacturing cost of the transmission. However, all synchronisation relying on friction surfaces for equalising the rotational speed of different parts of the transmission inherently results in energy losses when kinetical energy of the rotating parts is converted into heat.

There is thus a need for an improved method for preselecting gears in multi-clutch transmissions removing the above mentioned disadvantage.

It is desirable to provide a method for preselecting a gear in a multi-clutch transmission upon exiting free-wheeling state, where the previously mentioned problem of energy loss caused by synchronization is at least partly avoided.

The disclosure concerns a method for preselecting a gear in a multi-clutch transmission of a vehicle upon exiting free-wheeling state. The multi-clutch transmission comprises friction clutches drivingly connected to a prime mover, a transmission output shaft, and a main transmission that comprises input shafts connected to the friction clutches, a countershaft parallel to at least one of the input shafts, gearwheels and tooth clutches, where a first clutch of the friction clutches and a first subset of the tooth clutches are arranged to be selectively engaged in order to transfer torque in a first set of gears between the prime mover and the transmission output shaft, and where a second clutch of the friction clutches and a second subset of the tooth clutches are arranged to be selectively engaged in order to transfer power in a second set of gears between the prime mover and the transmission output shaft. The multi-clutch transmission when being operated in a free-wheeling state has a gear of the first set of gears preselected and the first friction clutch disengaged.

The inventive method comprises the steps of:

A) upon determining that at least one predetermined condition for exiting free-wheeling state is met; increasing the rotational speed of the prime mover towards a rotational synchronization speed of said preselected gear; the second friction clutch being in a closed state such that the rotational speed of the input shaft of the second friction clutch increases with the increasing rotational speed of the prime mover;

B) disengaging the second friction clutch;

C) engaging, at a suitable time point, at least one tooth clutch of said second subset of said tooth clutches corresponding to a gear of said second set of gears such that said gear of said second set of gears becomes preselected.

By carrying out the steps of the inventive method synchronizing elements such as a central synchronizing unit does not need to be activated to the same extent as the prior art solution in order for the countershaft to achieve the same rotational speed as the main shaft prior to engaging a tooth clutch of the second set of tooth clutches. An increase in the rotational speed of the countershaft is instead achieved preferably primarily by having the counter shaft rotationally connected to the prime mover during the engine speed increase following a freewheeling state, and the subsequent engagement of the tooth clutch of second subset of the tooth clutches being actuated once the rotational speed of the counter shaft has increased a certain extent. The inventive method thus reduces the degree of frictional synchronisation needed to preselect the gear of the second set of gears, thereby immediately reducing the level of energy dissipated as heat by the synchronisation device. The invention according to the inventive method consequently reduces the fuel consumption of the vehicle, reduces service costs of the clutch, and potentially increases the reliability compared with the prior art solution.

According to an aspect of the invention, the step of disengaging the second friction clutch is performed when the rotational speed of the input shaft of the second friction clutch has reached at least a predetermined percentage of the rotational synchronization speed of the gear of said second set of gears. Disengagement of the second friction clutch must be triggered by an event, and upon reaching at least a predetermined percentage of the rotational synchronization speed of the gear of said second set of gears is a good trigger point because this strategy is equally applicable for preselected of different gears, i.e. is applicable upon exiting freewheeling state with different vehicle speeds. The percentage is preferably selected to enable direct connected of the relevant tooth clutch or tooth clutches without further frictional synchronisation needed. Alternatively, step of disengaging the second friction clutch is performed when the rotational speed of the input shaft of the second friction clutch has reached at least a predetermined value. Alternatively, the step of disengaging the second friction clutch is performed when at least a predetermined time period has passed after begin of increasing the rotational speed of the prime mover.

According to an aspect of the invention, disengagement of the second friction clutch is preferably realised when the rotational speed of the input shaft of the second friction clutch has reached a rotational speed which is higher than the rotational synchronization speed of the gear of said second set of gears. Thereby, the frictional synchronisation is not necessary and the control system may select an appropriate time point for engaging the tooth clutch of the gear of the second set of gears, such that a jerk-free preselection is performed.

According to an aspect of the invention, disengagement of the second friction clutch is performed when the rotational speed of the input shaft of the second friction clutch has reached a rotational speed which is lower than the rotational synchronization speed of said gear of said first set of gears. There is no need to increase the rotational speed of the input shaft of the second friction clutch more than that.

According to an aspect of the invention, after disengagement of the second friction clutch and prior to engagement of at least one tooth clutch of said second subset of said tooth clutches, synchronizing by means of mechanical synchronizing means is performed, such that the speed of the input shaft of the second friction clutch becomes identical or nearly identical with the rotational synchronization speed of a gear of said second set of gears. Frictional synchronisation may be required in case the speed difference between the rotational speed 42 of the second input shaft and the rotational synchronisation speed 33 of the gear of the second set of gears is too large.

The drop in rotational synchronization speed of the input shaft of the second friction clutch towards that of a gear of the second set of gears is affected by the friction forces acting upon the countershaft. Thereby, the drop in rotational speed is slow and may be monitored and controlled such that the tooth clutch is brought to an engaged state when the speed difference is relatively small, for example in the range of 40-120 rpm. Engagement of the tooth clutch at the differential speed of the gear of the second set of gears reduces the risk of tooth-tooth wear and tear and contributes to rapid gearshifts.

A predetermined condition for determining that the multi-clutch transmission is ready to exit free-wheeling state may be that the rotational speed of the output shaft, connected to the wheels, is decreasing below a set value i.e. the hill is flattening out such that the speed/momentum of the vehicle drops.

The time point for starting increasing the rotational speed of the prime mover towards the rotational synchronization speed of the preselected gear is preferably chosen such as to achieve a balance between fuel savings made by a vehicle travelling in free-wheeling state and loss in momentum of the same vehicle e.g. resulting from travelling on a road flattening out after going downhill.

In free-wheeling state, and upon exiting free-wheeling, the second friction clutch may be in an engaged state. The second friction clutch may for example by connected to the drive shaft of an engine oil pump, or the like, such that engine power during idling in the free-wheeling state is required to be more or less continuously transferred via the second friction clutch. The degree of engagement can vary. For example, the second friction clutch may be in a fully engaged state, i.e. in its maximal or near maximal torque transfer capacity state. Alternatively, the second friction clutch may be in a semi-engaged state, i.e. in a state where torque transfer capacity is reduced. This engagement state can be advantageous at engine idling conditions and the like to prevent accidental stall of the engine in case of non-optimal engagement timing of the second friction clutch. Still more alternatively, the second friction clutch may be in a disengaged state.

Generally when the second friction clutch is in an engaged state during freewheeling state torque transfer between the prime mover and the transmission output shaft is disabled. In such a state, the input shaft of the second friction clutch is not connected to the transmission output shaft, i.e. no gear is selected to enable power transfer via the second friction clutch in the freewheeling state.

The method may also comprise a method step D); engaging the first friction clutch when the rotational speed of the prime mover reaches the rotational synchronization speed of the preselected gear of the first set of gears such that torque transfer from prime mover to the transmission output shaft is enabled. Hence, the preselected gear of the first set of gears is enabled. This step is preferably carried out after the increase of prime mover speed in step A). It may be performed before, after or simultaneously as step B).

The time point for actuating step D); engaging the first friction clutch to enable torque transfer via the preselected gear of the first set of gears, is determined by the fulfillment of preset conditions such as when the engine speed has stabilised at the rotational synchronization speed of the preselected gear of the first set of gears.

The steps of the method may be carried out in a sequence of A, B, D, C; A, D, B, C or A, B, C, D.

The step B) may be performed when the input shaft of the second friction clutch has reached a rotational speed which is higher than or equal to the rotational synchronization speed of the gear of the second set of gears and lower than the rotational synchronization speed of the gear of the first set of gears. Thereby the rotational speed the input shaft of the second friction clutch may start to slowly drop towards the rotational synchronization speed of the gear of the second set of gears. The rotational speed of the input shaft of the second friction clutch is preferably not dropping to a speed substantially below the rotational synchronization speed of the gear of the second set of gears before performing step C) of engaging the tooth clutch of the second subset of the tooth clutches corresponding to the gear of the second set of gears. Thereby no synchronizer is needed to match the rotational speeds.

If the rotational speed of input shaft of the second friction clutch is increased in step B to a speed which is near the rotational synchronization speed of the gear of the second set of gears, within an engaging range, step C) must be performed without delay in order to avoid dropping below the synchronization speed of the gear of the second set of gears.

The tooth clutch of the second subset of the tooth clutches corresponding to the gear of the second set of gears may be engaged in step C) when the rotational synchronization speed of the input shaft of the second friction clutch is within an engaging range of +/−20% of the synchronization speed of the gear of the second set of gears, preferably within an engaging range of +/−10%, and more preferably within an engaging range of +/−5%. A rotational synchronization speed of the input shaft of the second friction clutch falling within the engaging range of the synchronization speed of the gear of the second set of gears eliminates the risk of tooth-tooth clashes, resulting in worn, or broken, teeth and noise upon engaging the tooth clutch of the second subset of the tooth clutches. The preselection of the gear of the second set of gears is thus performed in a favourable manner, without using a synchronizer and without causing wear and tear of the affected components.

The first friction clutch is a normally open clutch. The second friction clutch is a normally closed clutch.

The multi-clutch transmission is arranged to be capable of shifting from one of the first or second set of gears to one preselected of the other of the first or second set of gears without interruption of the power transfer between the prime mover and the transmission output shaft.

The main transmission is arranged to, while transferring torque in one of the first or second set of gears, preselecting the other of the first or second set of gears.

The multi-clutch transmission used to carry out the steps of the inventive method may be a dual-clutch transmission.

The multi-clutch transmission may comprise a main transmission having six forwards gears, and a range transmission having two gears coupled to the main transmission, such that the multi-clutch transmission comprises a total of twelve forward gears.

Free-wheeling state is defined as the state when the vehicle is allowed to roll without propulsion torque being applied to the wheels from a power source of the vehicle. This is usually accomplished by disconnecting the engine from the driven wheels of the vehicle. Free-wheeling state is for example often enabled by automatic multi-clutch transmissions in heavy vehicles upon travelling downhill.

BRIEF DESCRIPTION OF DRAWINGS

In the detailed description below reference is made to the following figures, in which.

DETAILED DESCRIPTION

Various aspects of the disclosure will hereinafter be described in conjunction with the appended drawings to illustrate and not to limit the disclosure, wherein like designations denote like elements, and variations of the described aspects are not restricted to the specifically shown embodiment, but are applicable on other variations of the disclosure.

Figure 1:
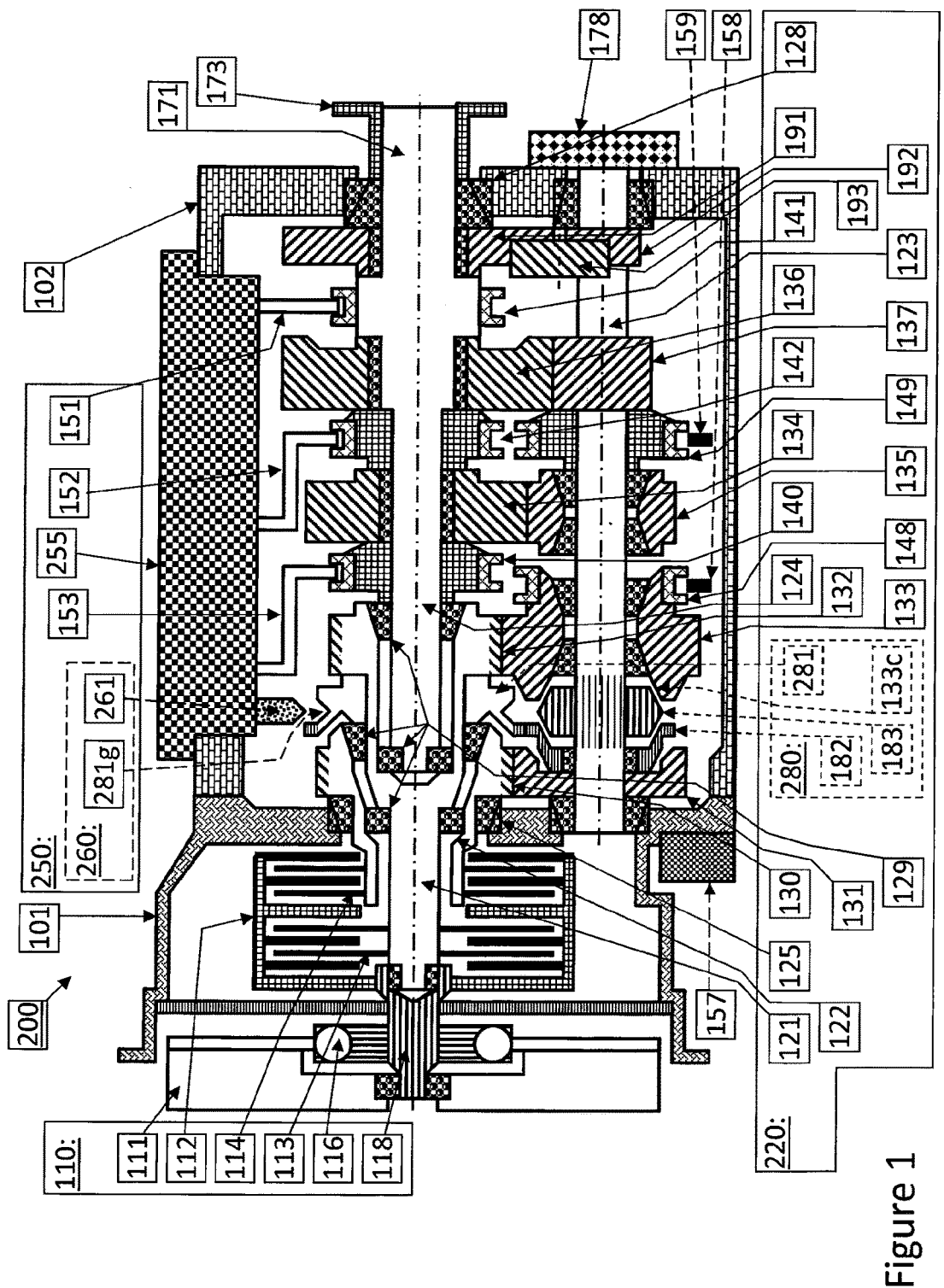
FIG. 1 shows, schematically, a dual clutch transmission used in an example of carrying out the method of the disclosure.

FIG. 1 shows schematically a longitudinal section of a dual clutch transmission 200. The transmission 200 comprises two housing parts; a clutch housing 101 and a main housing 102 (or multi-clutch transmission housing). In the clutch housing 101 a dual friction clutch 110 is arranged, comprising the flywheel 111, a torsional damper 116 bolted thereon, a clutch input shaft 118, and a dual clutch assembly 112 with a first clutch disc set 113 and a second clutch disc set 114. There is also an actuator device (not shown) to control the dual friction clutch 10. The flywheel 111 is attached to the prime mover i.e. the engine crankshaft (not shown).

A main transmission 220 is arranged inside the main housing 102. There are two input shafts; a first input shaft 121 and a second input shaft 122. The first input shaft 121 can be rotationally driven by the first friction clutch disc set 113. Similarly, the second input shaft 122 can be rotationally driven by the second friction clutch disc set 114.

First primary gear teeth 132 are integral with the first input shaft 121. Second primary gear teeth 130 are integral with the second input shaft 122. A main shaft 124 is coaxial with the input shafts 121 and 122. A countershaft 123 is parallel thereto. The second input shaft 122 is suspended in the clutch housing 101 by an input shaft bearing 125. Between the main shaft 124, first input shaft 121 and second input shaft 122, four pilot bearings 129 are arranged. The main shaft 124 is suspended in the main housing by a main shaft bearing 128. Thus, a thorough but not over-constrained suspension of the main and input shafts is achieved.

The main shaft 124 carries three loose gearwheels; the second secondary loose gearwheel 134, first secondary loose gearwheel 136 and reverse secondary loose gearwheel 191. The first and reverse secondary loose gearwheels 136 and 191 can be rotationally locked to the main shaft 124 by a first/reverse tooth clutch 141. The second secondary loose gearwheel 134 can be rotationally locked to the main shaft 124 by a second tooth clutch 142. Finally, the main shaft 124 can be rotationally locked to the first input shaft 121 by a direct tooth clutch 140.

On the countershaft 123 a second primary gearwheel 131 is rotationally fixed. It meshes with the second primary gear teeth 130 of the second input shaft 122. A primary countershaft loose gearwheel 133 meshes with the first primary gear teeth 132 of the first input shaft 121. A secondary countershaft loose gearwheel 135 meshes with second secondary loose gearwheel 134 on the main shaft 124. Furthermore, a first secondary gearwheel 137, which is integral with the countershaft 123, is meshing with the first secondary loose gearwheel 136 on the main shaft 124. Finally, a reverse secondary gearwheel 192 is integral with the countershaft 123 and drivingly connected with the reverse secondary loose gearwheel 191 via a reverse idler gearwheel 193. The primary countershaft loose gearwheel 133 can selectively be rotationally locked to the secondary countershaft loose gearwheel 135 by a first countershaft tooth clutch 148. The secondary countershaft loose gearwheel 135 can selectively be rotationally locked to the countershaft 123 by a second countershaft tooth clutch 149. An output shaft 171 is integral with the main shaft 124. A companion flange 173 is rotationally fixed thereon and is the interface to a not shown propeller shaft.

The main transmission 220 arranged inside the main housing 102 enables a total of six forward gears and one reverse gear. Combined with a two-speed planetary-based range transmission (non-showed) bolted to the output side of the main housing 102 the combined main and range transmissions provide in total twelve forwards gears and two reverse gears.

The automatic or semi-automatic gear shift is carried out by a gear-shift control unit 250. This gear-shift control unit 250 comprises a gear-shift control housing 255, a direct shift fork 153, a second shift fork 152 and a first/reverse shift fork 151. The direct shift fork 153 controls the direct tooth clutch 140. The second shift fork 152 controls the second tooth clutch 142, and the first/reverse shift fork 151 controls the first reverse tooth clutch 141.

The gear-shift control unit 250 will not be described in detail here. Its structural part, the gear-shift control housing 255, may be machined from a cast blank and is bolted to the main housing 102. Therein, microcontrollers, sensors, valves, and actuators may be found. The shift forks 151, 152 and 153 may be carried by shift rods that connect to actuators. Other configurations are possible; any of the shift forks 151, 152 and 153 may or may not be a part of the gear-shift control unit 250. Furthermore, the gearshift control unit 250 may be composed of different parts that are arranged at different locations of the transmission 200.

The countershaft tooth clutches 148 and 149 are controlled by a first countershaft shift fork 158 and a second countershaft shift fork 159. The shift forks 158 and 159 are actuated via shift rods (not shown) schematically by a countershaft actuator 157.

An optional power take-off drive unit 178 is bolted to the main housing 102 and rotationally connected to the countershaft 123. The power take-off drive unit 178 may drive, e.g., pumps, compressors and electric machines (not shown). It is not shown in detail, but may comprise housing parts, bearings, shafts, clutches and control parts for engagement and disengagement, gearings, and output flanges, as is readily known by a person skilled in the art.

An input shaft brake 260 acts on the sub-transmission of the first input shaft 121 that is active on odd gears. The input shaft brake 260 is schematically shown as a brake pad 261 that can selectively be brought in contact with a mating brake groove 281g in a modified input shaft synchronizing gearwheel 281 (on the first input shaft 121) of a modified central synchronizing unit 280. The input shaft brake 260 can be used for preselection of gears for a multi-step upshift without power interruption. In second gear, the gearwheels 130, 131, 137 and 136 are transferring power. In fifth gear, power is transferred by gearwheel 132, only and not via its gear teeth but axially, from the clutch-side end of the first input shaft 121 to the direct tooth clutch 140. Hence, there are no gearwheels that transfer power in both fifth and second gear. That makes it possible to adjust the speed of the sub-transmission of the first input shaft 121 to preselect fifth gear while driving in second gear. With a speed-increasing device, e.g., as in DE3739898A1, the opposite would be possible, too; preselect second gear while driving in fifth gear.

In the exemplified dual-clutch transmission, see FIG. 1, a central synchronizing unit 280 is located between the second primary gearwheel 131, second input shaft 122, first input shaft 121, and primary countershaft loose gearwheel 133. The central synchronizing unit 280 comprises an input shaft synchronizing gearwheel 281, a countershaft synchronizing loose gearwheel 182, a countershaft synchronizing twin cone 183, and an internal conical surface 133c on the primary countershaft loose gearwheel 133. The input shaft synchronizing gearwheel 281 is rotationally fixed with the first input shaft 121. The countershaft synchronizing loose gearwheel 182 is rotatably arranged on the countershaft 123. The countershaft synchronizing twin cone 183 is rotationally fixed with, but axially moveable on, the countershaft 123.

By axial displacement of the countershaft synchronizing twin cone 183, either of its external conical surfaces will mate with internal conical surfaces on the countershaft synchronizing loose gearwheel 182 or primary countershaft loose gearwheel 133. A friction torque will then arise that tends to reduce the relative speed between the conical surfaces in contact.

The input shaft synchronizing gearwheel 281 has a larger pitch diameter than the second primary gear teeth 130 (on the second input shaft 122), whose pitch diameter, in turn, is larger than that of the first primary gear teeth 132 of the first input shaft 121. Correspondingly, the pitch diameter is smaller for the countershaft synchronizing loose gearwheel 182 than for the second primary gearwheel 131 and primary countershaft loose gearwheel 133. Thus, by axially displacing the countershaft synchronizing twin cone 183 to the right in FIG. 1, the rotational speed of the primary countershaft loose gearwheel 133 can be made equal to that of the countershaft 123. The rotational speed of the first input shaft 121 will then be larger than that of the second input shaft 122, due to the smaller pitch diameter of the first primary gear teeth 132. Similarly, axial displacement of the countershaft synchronizing twin cone 183 to the left can make the speeds of the countershaft synchronizing loose gearwheel 182 and countershaft 123 equal. Then, the first input shaft 121 will rotate slower than the second input shaft 122, due to the large diameter of the input shaft synchronizing gearwheel 281. This set up is useful in normal driving state.

The inventive method of preselecting a gear without using synchronizers while exiting free-wheeling state will now be described in conjunction with FIG. 2. In the example, see FIG. 2, the multi-clutch transmission 200 is set in a free-wheeling state, for example rolling down a hill. In the present example the first friction clutch 113 is disengaged and the second friction clutch 14 is engaged. The prime mover is set in an idling mode and being disconnected from the driving wheels. A gear of the first set of gears, gear eleven in this example having a range transmission in high, associated with the first friction clutch 113 is preselected by having the direct tooth clutch 140 engaged such that input shaft 121 of the first friction clutch 113 is connected to the main shaft 124. Thereby the input shaft 121 of the first friction clutch 113 is synchronized with the rotational speed of the main shaft 124. Gear eleven is consequently preselected and readily available for transmitting torque from the driving wheels of the prime mover at a suitable time in case of a sudden engine stop during the free-wheeling state. Concurrently, gear eleven is also readily available for transmitting torque from the engine to the driving wheels, for example when the speed of the vehicle drops below a preset value such as 75 km/h. The gear chosen for preselection and the time point at which it is engaged upon exiting free-wheeling are set by preset conditions. The second friction clutch 114 is in an engaged state during freewheeling because the engine oil-pump is powered via the counter shaft 123. As a result, the rotational speed of the countershaft corresponds to the engine idling speed.

Figure 2:
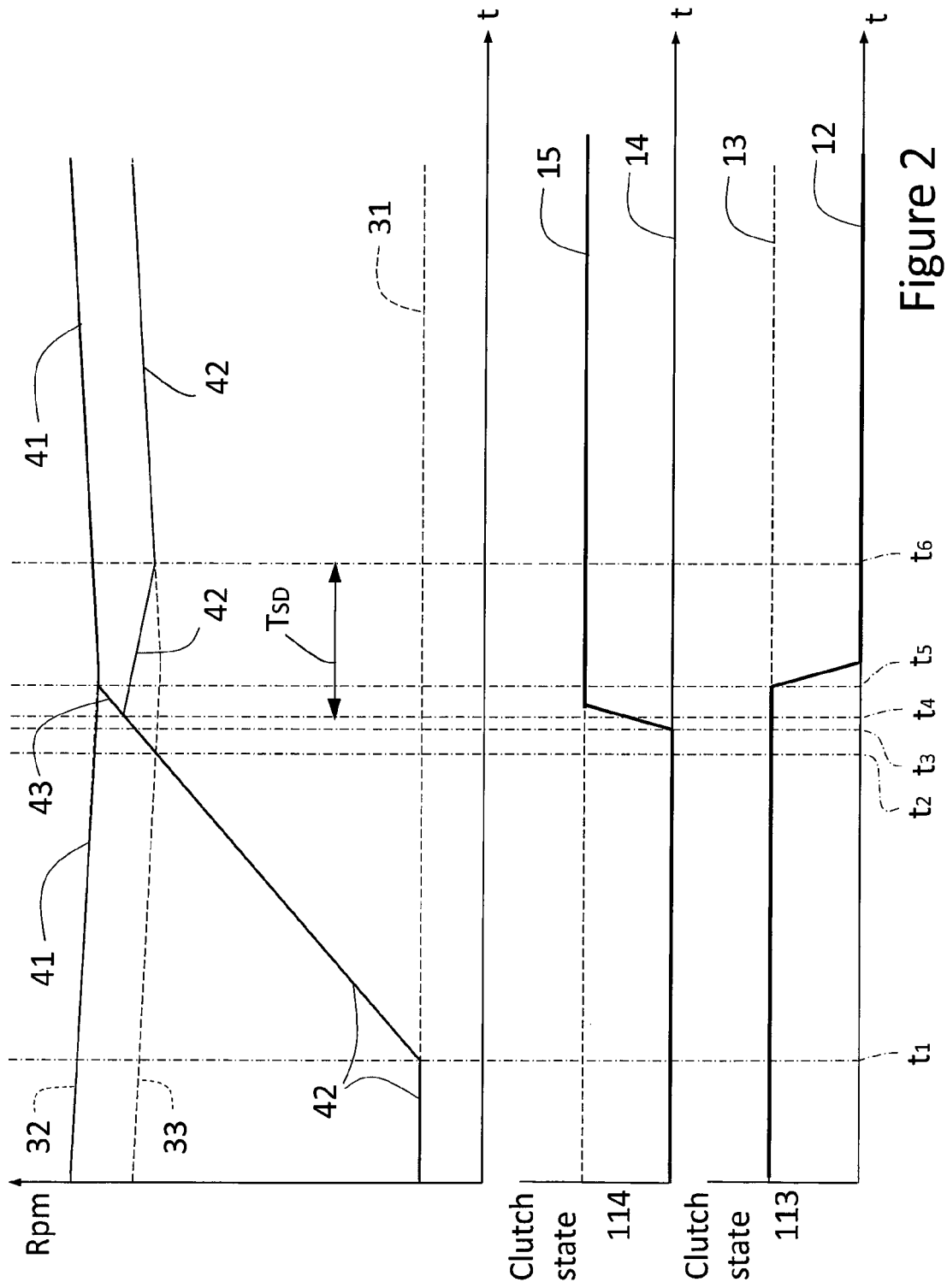
FIG. 2 shows a graphical illustration of an exemplary exit of the freewheeling state according to the disclosure.

In FIG. 2, the rotational speed 41 of the first input shaft 121 and the rotational speed 42 of the second input shaft 122 are shown. Before time ti the rotational speed 41 of the first input shaft 121 is identical to the rotational synchronisation speed 32 of the preselected eleventh gear, and the rotational speed 42 of the second input shaft 122 is identical to the engine idling speed 31 due to having the second friction clutch 114 in an engaged state. Also shown in FIG. 2 is the engagement status of the first and second friction clutches 113, 114. Before time ti the first friction clutch 113 is in a disengaged state 13 and the second friction clutch 114 is in an engaged state 14. At this stage the rotational synchronisation speed 32 of the preselected eleventh gear as well as the rotational synchronisation speed 33 of the not yet preselected twelfth gear is slowly decreasing due to the slowing down of the vehicle upon reaching the end of the downhill. Note here that the rotational synchronisation speed 32 of the preselected eleventh gear is higher than the rotational synchronisation speed 33 of the gear of the second set of gears, namely gear twelve in this example.

At ti in FIG. 2 it is determined that the predetermined condition for exiting free-wheeling state is met. In response thereto an increase of the rotational speed 43 of the prime mover crank shaft, from engine idle speed 31 towards the rotational synchronization speed 32 of the preselected eleventh gear, is initiated. Thereby, due to the second friction clutch 114 being in an engaged state, the rotational speed 42 of the second input shaft 122 and the thereto engaged countershaft 123 is increased towards the rotational synchronisation speed 32 of the preselected gear eleven. The predetermined condition which is fulfilled at time point ti may for example be a drop in vehicle speed down to 77 km/h. Any other condition may however be used. At t2 the rotational speed of the second input shaft 122 has reached the rotational synchronization speed 33 of gear twelve. The second friction clutch 114 remains engaged 14 in this example.

The term "rotational synchronization speed" of any gear is hereinafter defined as the actual or imaginary rotational speed, depending on the circumstances, the transmission input shaft associated with that gear would exhibit if that gear was mechanically connected to the transmission output shaft.

The step of initiating disengagement of the second friction clutch 14 occurs at time t3, thereby beginning switching the second friction clutch 114 from an engaged state 14 to a disengaged state 15. Time t3 is preferably selected to enable the countershaft 123 to slow down for a certain time period TSD due to internal rotational friction forces within the transmission before reaching the rotational synchronisation speed 33 of the twelfth gear. Later disengagement is alternatively possible. At time tt, the second friction clutch 114 is sufficiently disengaged to stop transferring the torque from the accelerating engine and thereby enabling the rotational speed 42 of the second input shaft 122 to start slowing down. The rotational speed 42 of the second input shaft 122 thus starts dropping towards the rotational synchronization speed 33 of gear twelve. Due to the nature of the disengagement the drop is not instant i.e. t4 is lagging behind t3.

At ts, subsequent to disengaging the second friction clutch 114, engagement of the first friction clutch 113 is initiated such that the prime mover is able to transfer torque via the first input shaft 121, direct tooth clutch 140 and main shaft 124 to the output shaft 171. This event thus switches the first friction clutch 113 from a disengaged state 13 to an engaged state 12. The step of engaging the first friction clutch 113 is initiated at ts, i.e. when the rotational speed 43 of the engine has reached, and preferably stabilised at, a level substantially equal or close to the rotational speed 41 of the first input shaft 121, which is connected to the output shaft 171. Thereby the risk of a sudden jerk or acceleration is reduced upon clutch engagement. After complete engagement of the first friction clutch 113 the vehicle may start accelerating towards a desired speed, driven by the prime mover, all without interruption upon exiting free-wheeling state and engaging the gear of the first set of gears. In this example the preselected gear eleven, the gear of the first set of gears, has been chosen to be suitable for torque transfer upon exiting the free-wheeling state i.e. as the downhill flattens out, and the twelfth gear is considered suitable for becoming preselected gear of the second set of gears.

The above described step of engaging the first friction clutch 113, which is initiated at t5 in FIG. 2, may also be performed prior to or simultaneously to disengaging the second friction clutch 114 i.e. t5 may coincide with or occur prior to t3. Initiating of the engagement of the preselected gear of the first set of gears, at ts, is preferably realised as soon as possible to avoid any unnecessary engine speeding without any clutch being engaged.

The rotational speed 42 of the second input shaft 122, being engaged to the countershaft 123, drops until reaching a suitable differential synchronization speed of gear twelve. A differential synchronization speed of any gear is defined a speed close to the speed of said gear but not the same as the speed of said gear. For example a speed difference of about 10-100 rpm. This speed difference reduces the risk of tooth-to-tooth engaging situations upon tooth clutch engagement. Too high speed difference increases noise and risk for damages. Upon reaching the suitable differential synchronization speed of gear twelve at time, engagement of at least one of the two tooth clutches 148, 149 of gear twelve is initiated; thereby preselecting gear twelve. In this example the primary countershaft loose gearwheel 133 is rotationally locked to the secondary countershaft loose gearwheel 135 by a first countershaft tooth clutch 148 and the secondary countershaft loose gearwheel 135 is rotationally locked to the countershaft 123 by a second countershaft tooth clutch 149, all without need for any frictional synchronization between the relevant rotating parts. The slow drop in rotational synchronization speed, occurring between t3 and te, of the countershaft 123 connected to the second input shaft 122, due to frictional forces, enables accurate monitoring of the speed 42 of the second input shaft 122 and subsequent well-timed engagement of the tooth clutches 148, 149. The time frame for engaging the tooth clutches 148, 149, actuated at, is determined as being when the rotational speed 42 of the second input shaft 122 is within an engaging range of +/−20% of the rotational synchronization speed 33 of the gear of the second set of gears (gear twelve in this example), or within an engaging range of +/−10%, or within an engaging range of +/−5%.

Following the preselection of gear twelve, the method may also include disengagement of the first friction clutch 113 simultaneously or prior to engagement the second friction clutch 114; thereby disabling the gear of the first set of gears, gear eleven, and enabling torque transfer from the prime mover to the output shaft 171 by the gear of the second set of gears, e.g. gear twelve. This shift in gears from the eleventh to the twelfth gear generally occurs after the process of preselecting the twelfth gear (not seen in FIG. 2).

As illustrated in FIG. 2, the rotational speed 42 of the input shaft 122 of the second friction clutch 114 is preferably increased to a level sufficiently high for direct engagement of the required tooth clutch for preselecting the next gear, without use of any mechanical synchronizing means, because this control strategy minimizes the energy losses incurred for preselecting a higher gear upon exiting free-wheeling state. However, this control strategy may be realised also when the rotational speed 42 of the input shaft 122 of the second friction clutch 114 has not yet reached the rotational synchronization speed 33 of the next higher gear, but is sufficiently closed. Typically, a 10% speed difference may be considered acceptable. With increasing speed difference the risk for damages and noise increases upon connection of the tooth clutches. Hence, the second friction clutch 114 may be arranged to disengage already upon reaching for example 90% of the rotational synchronization speed 33 of the next gear, which event being followed by a more or less immediate engagement of the relevant tooth clutches for the gear to become preselected.

The gearshift while exiting free-wheeling state as exemplified above, from e.g. gear eleven to gear twelve, is achieved in a fast and gentle manner by utilizing the rotational speed of the prime mover instead of an activated synchronizer to increase the speed of the countershaft before engaging the gear tooth clutches of the gear to be preselected. As an alternative to engaging the eleventh gear and preselecting the twelfth gear the method would be equally applicable when having for example the ninth gear preselected during the free-wheeling state and subsequently preselecting the tenth gear upon exiting the free-wheeling state. The difference being merely in the conditions for determining when to exiting the free-wheeling state and what tooth clutches are involved in preselecting the tenth gear.

Figure 3:
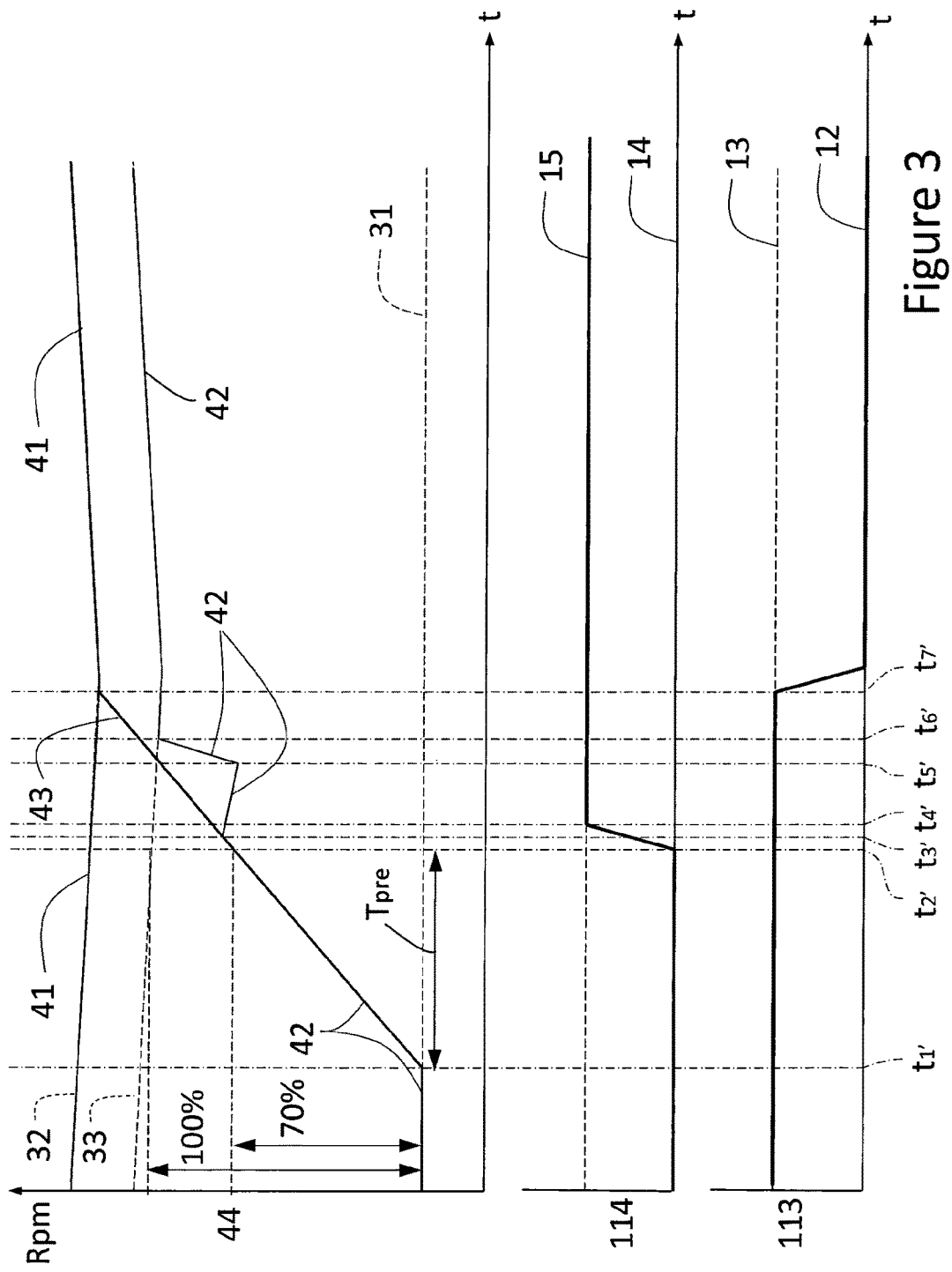
FIG. 3 shows another graphical illustration of another exemplary exit of the freewheeling state according to the disclosure.

The inventive method of preselecting a gear with a reduced level of mechanical synchronisation while exiting free-wheeling state will now be described in conjunction with FIG. 3. In the example of FIG. 3, all aspects concerning the operational state of the multi-clutch transmission 200, the present driving conditions and the vehicle free-wheeling state are identical to the example of FIG. 2. See text above in relation to FIG. 2 for details about these aspects.

At t1' in FIG. 3 it is determined that the predetermined condition for exiting free-wheeling state is met. In response thereto the rotational speed 43 of the prime mover crank shaft from engine idle speed 31 is increased towards the rotational speed 41 of the first input shaft 121, which here is identical to rotational synchronization speed 32 of preselected gear eleven. At t2' the rotational speed 42 of the second input shaft 122 has reached a predetermined percentage of the rotational synchronization speed 33 of gear twelve, for example 70%. As a result disengagement of the second friction clutch 114 is initiated according to this example. At time t3', the second friction clutch 114 is sufficiently disengaged to stop transferring the torque from the accelerating engine and thereby enabling the rotational speed 42 of the second input shaft 122 to start slowing down. At t4' the second friction clutch is completely disengaged.

At t5' frictional synchronisation of the gear twelve is performed by means of synchronization means, such as the central synchronizing unit 280. As a result, the rotational speed 42 of the second input shaft 122 quickly increases to the rotational synchronisation speed 33 of gear twelve, thereby enabling engagement of at least one of the two tooth clutches 148, 149 of gear twelve at time t6', such that gear twelve becomes preselected. The level of frictional losses is however reduced compared with a conventional gear box because the speed 42 of the second input shaft 122 had reached 70% of the required speed, and only the remaining 30% speed difference will be converted to heat during the mechanical synchronisation process between time t5' top t6'. Subsequent engagement of the first friction clutch 113 is similar to the example shown and described in relation to FIG. 2 and therefore not described in detail here. The predetermined percentage is not limited to 70% as shown in the example, but may alternatively be for example 30%, 60% or 90%.

In FIG. 3, disengagement of the second friction clutch 114 is performed when the rotational speed 42 of the input shaft 122 of the second friction clutch 114 reaches a predetermined percentage of the rotational synchronization speed 33 of the gear of said second set of gears. However, many alternative solutions are possible. For example, disengagement of the second friction clutch 114 may be performed when the rotational speed 42 of the input shaft 122 of the second friction clutch 114 reaches a predetermined value 44, such as for example 300 rpm, 600 rpm, or 900 rpm. According to still an alternative, disengagement of the second friction clutch 114 may be performed when a predetermined time period Tpre has passed after begin of increasing the rotational speed 43 of the prime mover. The predetermined time period may be for example 0.3 seconds, 0.6 seconds or 1.0 seconds. Similar to above, preselection of gear twelve while exiting free-wheeling state as exemplified above, may alternatively be preselection of the tenth gear, or any other gear, depending on the specific layout of the gearbox.

Figure 4D:
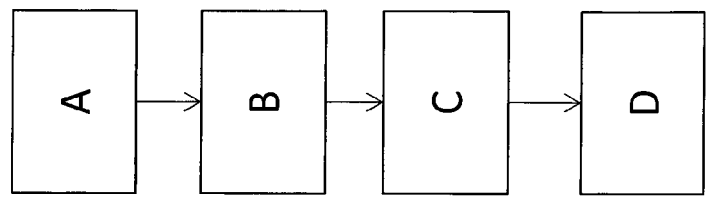
FIG. 4a-4d shows alternative flow charts of the steps carried out in the method.
Figure 4C:
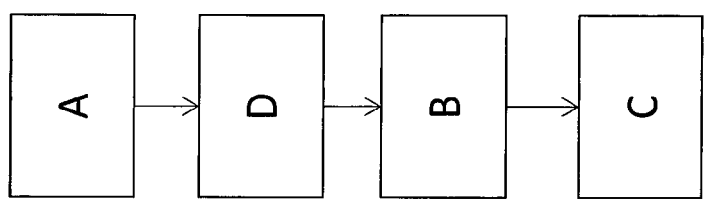
Figure 4B:
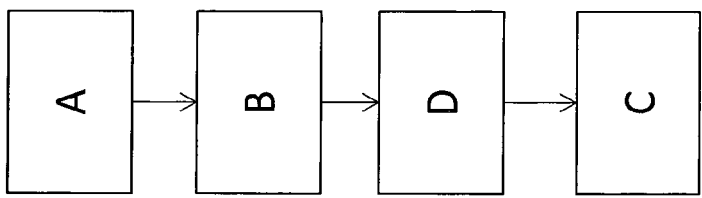
Figure 4A:
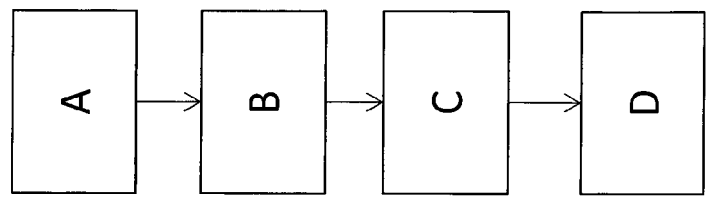

The basic method steps for preselecting a gear in a multi-clutch transmission 200 of a vehicle upon exiting free-wheeling state will now be schematically illustrated in FIG. 4a. The basic method comprises step A) of determining a suitable time point for initiating termination of the free-wheeling state. This is here performed by monitoring if one or more predetermined conditions for exiting free-wheeling state are met. For example if the vehicle speed has decreased below a predetermined limit. Upon determining that the predetermined condition for exiting free-wheeling state has been met, the rotational speed of the prime mover is increased towards the rotational synchronization speed of said preselected gear of the first set of gears. For example gear eleven in the disclosed twelve geared transmission. Because the second friction clutch 114 is in a closed state during this increase of engine speed the rotational speed of the second input shaft 122 will automatically also increase with the increasing rotational speed of the prime mover. Hence, instead of using friction forces for synchronizing the speed of the gearwheels 133, 135 of the twelfth gear the increasing speed of the prime mover is used instead, thereby reducing the energy losses and wear of the transmission.

In step B) the second friction clutch 114 is disengaged when a predetermined criteria is fulfilled. Preferably, the second friction clutch 114 is disengaged when the second input shaft 122 has reached a speed 42 above the rotational synchronization speed 33 of the gear to be preselected for allowing the speed 42 of the second input shaft to slow down for a small time period before the step of preselecting the gear of the second set of gears is performed. The slowing down of the second input shaft 122 is caused by the internal rotational friction within the transmission, for example friction losses in bearings of the shafts and loose gearwheels, as well as lubrication oil splashing losses. By enabling the rotational speed 42 of the second input shaft 122 to slow down for a certain time period the engagement of the tooth clutch of the gear to become preselected can be properly controlled and timed to enable a relatively smooth engagement of the relevant tooth clutch. Alternatively, as described above, second friction clutch 114 is disengaged before the second input shaft 122 has reached the rotational synchronization speed 33 of the gear to be preselected. This control strategy may require a certain level of friction synchronization for increasing the speed 42 of the second input shaft 122 up to a level where engagement of the relevant tooth clutch can be performed.

In step C) at least one tooth clutch corresponding to the gear to become preselected is engaged a suitable time point. The time point is preferably selected to enable a relatively smooth engagement of the relevant tooth clutch with the relevant gearwheel, as well as avoiding engagement at an identical speed for avoiding a possible tooth to tooth engagement of the relevant tooth clutch and gearwheel. A small difference in rotational speed between the relevant parts is preferred upon engaging, for example when the rotational speed 42 of the second input shaft 122 is within a range of +/−20% of the synchronization speed 33 of said gear of the second set of gears, preferably within a range of +/−10%, and more preferably within a range of +/−5%.

As illustrated in the flow charts of FIG. 4b-4d, the method may additionally comprise the step D) of engaging the first friction clutch 113 when the rotational speed 43 of the prime mover reaches the rotational synchronization speed 32 of the preselected gear of said first set of gears. First upon engagement of the first friction clutch 113 can torque be transferred from the prime mover to the transmission output shaft 171 for propulsion of the vehicle. The time point of engagement of the first friction clutch 113, as well as the acceleration rate of the prime mover, is preferably controlled and timed to smoothly engage and initiate torque transfer to the driving wheels for enabling high driver comfort.

The sequence of the steps A), B), C) and D) disclosed above may be performed in various ways. Step A) will always be performed before step B) for enabling the advantage of the disclosure, because otherwise the speed of the second input shaft 122 will not increase together with the increasing speed of the prime mover. The step C) may be performed before, simultaneously or after step B), depending on the time point of engagement of the second friction clutch 114 in step B) and the deceleration rate of the second input shaft 122 after disengagement of second friction clutch 114. In a more radical alternative, step B) and C) are performed substantially simultaneously. Preferably, step B) is performed before step C) to enable monitoring of decreasing rotational speed 42 of the second input shaft 122 for a certain time period for a proper engagement of the tooth clutch 148, 149. Consequently, the basic steps may be carried out in the following sequences: A-B-C, A-C-B, or A-B/C. B/C refers here to the event of performing steps B) and C) simultaneously.

Also the step D) may be performed before, simultaneously or after steps B) and C). For example, as shown in FIG. 4b, the step D) is carried out between step B and step C), i.e. in the sequence of A, B, D, C. This order may be the most common order because it is likely that the engine speed 43 will reach the synchronization speed 32 of the preselected gear faster than it takes for the second input shaft 122 to slow down sufficiently to enable a gear of the second set of gears to become preselected.

Alternatively, step D) is performed before steps B) and C) as illustrated in FIG. 4c, although there is no particular advantage of waiting with disengagement of the second friction clutch 114 in step B) for so long.

According to yet an alternative sequence step D) is performed after steps B) and C), as illustrated in FIG. 4d. This sequence may occur when the second friction clutch 114 is disengaged close to or before the time point when the rotational speed 42 of the second input shaft 122 coincides with the synchronization speed 33 of the gear of the second set of gears to become preselected, such that the speed of the second input shaft 122 will only slow down very little or even be force to increase by means of synchronization means before the tooth clutch for preselecting said gear is engaged. This means that step C) is performed very closely after step B), and before the engine speed 43 has reached the synchronization speed 32 of the preselected gear of the first set of gears.

In the described sequences of FIG. 4b-4c the step B) was always performed before step C). However, if step B) is performed after step C) the additional sequence A-C-B-D is feasible, and in the event of performing steps B) and C) simultaneously then step D) may be performed before or after the B/C event. Finally, the D) may be performed simultaneously with any combination of steps B) and C) although this increases the risk of jerks due to reduced control margins.

The inventive method is described herein in conjunction with a dual-clutch transmission of FIG. 1. However, the inventive method may alternatively be carried out by any other suitable multi-clutch transmissions.

Reference signs mentioned in the claims should not be seen as limiting the extent of the matter protected by the claims, and their sole function is to make claims easier to understand.

As will be realised, the disclosure is capable of modification in various obvious respects, all without departing from the scope of the appended claims. Accordingly, the drawings and the description thereto are to be regarded as illustrative in nature, and not restrictive.

The invention claimed is:

1. Method for preselecting a gear in a multi-clutch transmission of a vehicle upon exiting a free-wheeling state, the multi-clutch transmission comprising friction clutches drivingly connected to a prime mover, a transmission output shaft, and a main transmission that comprises input shafts connected to the friction clutches, a countershaft parallel to at least one of the input shafts, gearwheels and tooth clutches, where a first clutch of the friction clutches and a first subset of the tooth clutches are arranged to be selectively engaged in order to transfer torque in a first set of gears between the prime mover and the transmission output shaft, and where a second clutch of the friction clutches and a second subset of the tooth clutches are arranged to be selectively engaged in order to transfer torque in a second set of gears between the prime mover and the transmission output shaft; wherein the multi-clutch transmission being operated in the free-wheeling state having a gear of the first set of gears preselected; the first friction clutch being disengaged; the method comprising the steps:

A) upon determining that at least one predetermined condition for exiting the free-wheeling state is met; increasing a rotational speed of the prime mover towards a rotational synchronization speed of the preselected gear; the second friction clutch being in a closed state such that a rotational speed of the input shaft of the second friction clutch increases with increasing rotational speed of the prime mover;

B) disengaging the second friction clutch;

C) engaging at least one tooth clutch of the second subset of the tooth clutches corresponding to a gear of the second set of gears such that the gear of the second set of gears becomes preselected wherein the step of disengaging the second friction clutch is performed when
the rotational speed of the input shaft of the second friction clutch has reached at least a predetermined percentage of a rotational synchronization speed of the gear of the second set of gears, or
the rotational speed of the input shaft of the second friction clutch has reached at least a predetermined value, or at least a predetermined time period (Tpre) has passed after a beginning of the increasing of the rotational speed of the prime mover in step A),
wherein the rotational synchronization speed of the gear of the second set of gears being lower than a rotational synchronization speed of the gear of the first set of gears.

2. Method according to claim 1, wherein the predetermined percentage is 30%.

3. Method according to claim 1, wherein the predetermined value is 300 rpm.

4. Method according to claim 1, wherein the predetermined time period is 0.3 seconds.

5. Method according to claim 1, comprising disengaging the second friction clutch when the rotational speed of the input shaft of the second friction clutch has reached a rotational speed which is higher than the rotational synchronization speed of the gear of the second set of gears.

6. Method according to claim 5, comprising disengaging the second friction clutch when the rotational speed of the input shaft of the second friction clutch has reached a rotational speed which is lower than the rotational synchronization speed of the gear of the first set of gears.

7. Method according to claim 1, comprising, after disengagement of the second friction clutch and prior engagement of at least one tooth clutch of the second subset of the tooth clutches, synchronizing, by means of mechanical synchronizing means, the speed of the input shaft of the second friction clutch with the rotational synchronization speed of the gear of the second set of gears.

8. Method according to claim 1, wherein the second friction clutch is in an engaged state during the free-wheeling state; and torque transfer between the prime mover and the transmission output shaft is disabled.

9. Method according to claim 1, wherein the method also comprises the step D) engaging the first friction clutch when the rotational speed of the prime mover reaches a rotational synchronization speed of the preselected gear of the first set of gears such that torque transfer from prime mover to the transmission output shaft is enabled.

10. Method according to claim 9, wherein the steps are carried out in a sequence of A, B, D, C; A, D, B, C or A, B, C, D.

11. Method according to claim 1, wherein the tooth clutch of the second subset of the tooth clutches corresponding to the gear of the second set of gears is engaged when the rotational speed of the input shaft of the second friction clutch is within a range of +/−20% of the rotational synchronization speed of the gear of the second set of gears.

12. Method according to claim 1, wherein the first friction clutch is a normally open clutch.

13. Method according to claim 1, wherein the second friction clutch is a normally closed clutch.

14. Method according to claim 1, wherein the multi-clutch transmission is arranged to be capable of shifting from one of the first or second set of gears to one preselected of the other of the first or second set of gears without interruption of the power transfer between the prime mover and the transmission output shaft.

15. Method according to claim 1, wherein the main transmission is arranged to, while transferring torque in one of the first or second set of gears, preselect the other of the first or second set of gears.

16. Method according to claim 1, wherein the multi-clutch transmission is a dual-clutch transmission.

17. Method according to claim 1, wherein the multi-clutch transmission comprises the main transmission having six forwards gears, and a range transmission having two gears coupled to the main transmission, such that the multi-clutch transmission comprises a total of twelve forward gears.

18. A computer comprising a computer program for performing the steps of claim 1 when the program is run on the computer.

19. A tangible, non-transitory computer readable medium comprising a computer program for performing the steps of claim 1 when the program is run on a computer.

20. A control unit for controlling a multi-clutch transmission of a vehicle upon exiting the free-wheeling state, the control unit being configured to perform the steps of the method according to claim 1.

* * * * *